(12) United States Patent
Slesinger et al.

(10) Patent No.: US 9,098,823 B2
(45) Date of Patent: Aug. 4, 2015

(54) SHELF POWER SYSTEM

(71) Applicant: Powerwall Inc., San Francisco, CA (US)

(72) Inventors: Bruce M. Slesinger, San Francisco, CA (US); Thomas L. Collom, San Francisco, CA (US)

(73) Assignee: Powerwall, Inc., San Francisco, CA (US)

( * ) Notice: Subject to any disclaimer, the term of this patent is extended or adjusted under 35 U.S.C. 154(b) by 120 days.

(21) Appl. No.: 13/765,557

(22) Filed: Feb. 12, 2013

(65) Prior Publication Data
US 2014/0224875 A1 Aug. 14, 2014

(51) Int. Cl.
| | |
|---|---|
| *G07F 19/00* | (2006.01) |
| *G06Q 10/08* | (2012.01) |
| *A47F 5/10* | (2006.01) |
| *A47B 96/02* | (2006.01) |
| *A47F 5/00* | (2006.01) |
| *H01R 25/14* | (2006.01) |
| *H01R 13/62* | (2006.01) |

(52) U.S. Cl.
CPC ............ *G06Q 10/087* (2013.01); *A47B 96/021* (2013.01); *A47F 5/0043* (2013.01); *A47F 5/101* (2013.01); *H01R 25/142* (2013.01); *A47B 2220/0077* (2013.01); *H01R 13/6205* (2013.01)

(58) Field of Classification Search
USPC .................................. 235/375, 381, 383, 385
IPC .................... G06Q 10/087,10/08, 30/02, 30/06, G06Q 20/20, 20/342; G07F 7/1008, 7/08
See application file for complete search history.

(56) References Cited

U.S. PATENT DOCUMENTS

| | | | |
|---|---|---|---|
| 5,695,261 A | 12/1997 | Slesinger et al. | |
| 6,179,434 B1 * | 1/2001 | Saraiji | ........................... 362/125 |
| 6,918,679 B2 | 7/2005 | Wu | |
| 7,766,502 B2 | 8/2010 | Tress | |
| 2012/0230018 A1 | 9/2012 | Wiemer et al. | |

FOREIGN PATENT DOCUMENTS

| | | |
|---|---|---|
| CN | 101578061 | 11/2009 |
| JP | 2011062342 | 3/2011 |
| KR | 101052472 | 7/2011 |

OTHER PUBLICATIONS

Notification of Transmittal of The International Search Report and The Written Opinion of the International Searching Authority, PCT/IB2014/000541, mailed Aug. 13, 2014.

* cited by examiner

*Primary Examiner* — Karl D Frech
(74) *Attorney, Agent, or Firm* — Womble, Carlyle, Sandridge & Rice (57) ABSTRACT

A shelf lighting system, which includes a shelf power system, is herein disclosed. The shelf power system has a power track and a connecting plug. The connecting plug has an attachment mechanism to attach to a shelf bracket, and is configured to electrically connect to the power track. One embodiment of the connecting plug has prongs that electrically contact conductors in the power track. The shelf lighting system further includes a driver with a power supply and a power terminal block that connects to the power track. A lighting fixture can be powered by the power supply via the power terminal block, the power track and the connecting plug.

18 Claims, 8 Drawing Sheets

SHELF POWER SYSTEM

BACKGROUND

Retail, office and home environments frequently make use of shelving, and lighting to illuminate or even showcase items on a shelf. Movable shelves are often supported on shelf brackets, which attached to shelf support columns. Typically, each shelf support column attaches to a wall or other supporting member, and has a series of apertures to which the shelf brackets affix. A shelf or a series of shelves is generally supported by two shelf support columns, one at each end of the shelf, and optionally one or more additional shelf support columns in the middle. It would be advantageous to provide for lighting or other electrical needs at the shelves.

U.S. Pat. No. 5,695,261 describes a modular furniture system having vertical standards with internal conductors. The conductors are coupled to a source of low-voltage electrical power such that adjacent vertical standards are of differing electrical polarity. Brackets supporting the shelves of the modular furniture system make electrical contact with the internal conductors when a bracket is engaged in a vertical standard. A light fixture, coupled between a pair of brackets engaged with adjacent vertical standards, can be energized. Yet, there is a need in the art for improvements and alternatives to the above-described system.

SUMMARY

A shelf power system is herein disclosed. One embodiment of a shelf power system includes a power track and a connecting plug. The power track has a first conductor and a second conductor. The first conductor and the second conductor are along a length of the power track. The connecting plug has a coupling mechanism configured to couple the connecting plug to a shelf bracket. The plug has a first prong and a second prong extending from a surface of the plug. The first prong and the second prong are configured to couple the plug to the power track such that the first prong electrically contacts the first conductor and the second prong electrically contacts the second conductor. A connector configured to provide an electrical connection to the first prong and the second prong is included.

A shelf lighting system is provided. One embodiment of the shelf lighting system includes a power track disposed within a vertical support member of the shelf lighting system and a power source having a power supply and a power terminal block configured to electrically couple the power supply to the power track. The system includes a lighting fixture and a plug that is configured to attach to a shelf bracket extending from the vertical support member. The plug is operable to electrically couple the power track to the lighting fixture, wherein the lighting fixture is powered by the power supply via the power terminal block, the power track and the plug.

In some embodiments, an inventory management system is integrated with a shelf lighting system. The inventory management system may be a stand alone system in some embodiments. The inventory management system includes a power track disposed within a vertical support member of the shelf lighting system. A power source having a power supply and a power terminal block configured to electrically couple the power supply to the power track is included. A lighting fixture coupled to a bottom surface of a shelf of the shelf lighting system is included. A plug that is configured to attach to a shelf bracket extending from the vertical support member is included. The plug is operable to electrically couple the power track to the lighting fixture, wherein the lighting fixture is powered by the power supply via the power terminal block, the power track and the plug. The system includes an inventory capture device coupled to the shelf lighting system. The inventory capture device is powered by the power supply through the power track and the plug. The inventory capture device is in communication with a computing device having the inventory management system stored therein, wherein the inventory capture device is operable to detect removal of an item from the shelf and/or track specific items on the shelf.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

FIGS. 1-7 depict a shelf lighting system 100 with an included shelf power system and components thereof, in accordance with some embodiments. Electrical power is routed through conductors in a power track and through a connecting plug to a lighting fixture. The shelf lighting system is modular and is readily assembled, disassembled and reconfigured for varied shelf spacing and varied lighting needs. Multiple lighting fixtures and associated connecting plugs can be powered through a single power track.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
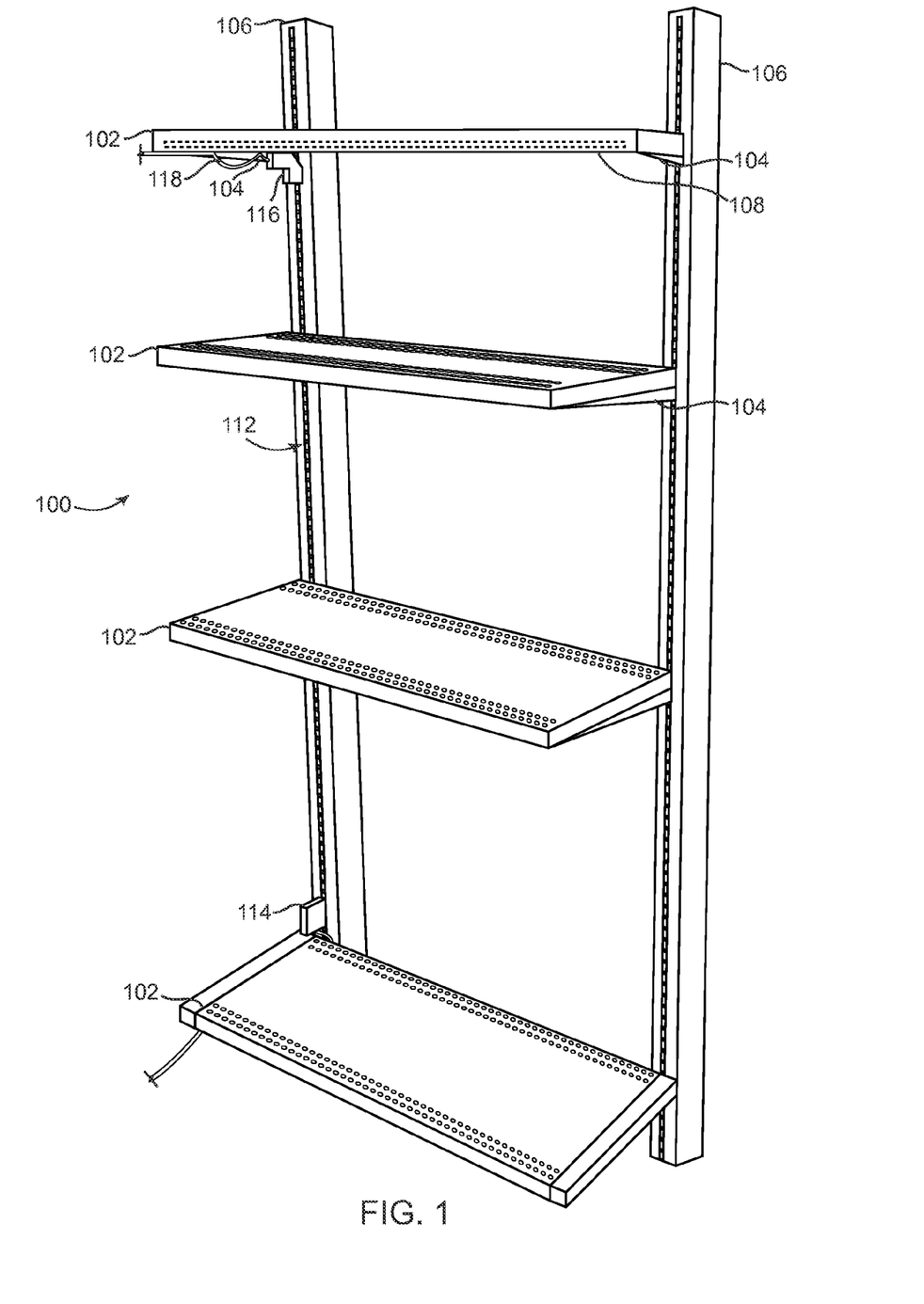
FIG. 1 is a perspective view of an embodiment of a shelf lighting system that includes a shelf power system.

In FIG. 1, modular shelving is shown with an embodiment of the shelf lighting system 100 installed. The modular shelving includes shelves 102 supported by shelf brackets 104, which are in turn supported by shelf support columns 106. A lighting fixture 108 (not visible, but see FIG. 6) is attached under the forward edge of one or more of shelves 102. Additional light fixtures 108 may be attached under additional shelves 102. Inside one of the shelf support columns 106, a power track (not visible, but see FIGS. 2 and 3) routes electrical power from a power terminal block 114 to a connecting plug 116. A shelf power cord 118 routes electrical power from the connecting plug 116 to the lighting fixture 108. A power supply (not visible, but see FIG. 4) provides electrical power to the power terminal block 114. Components that are not visible may be hidden for aesthetic reasons, giving the installation a pleasing, uncluttered appearance.

Figure 4:
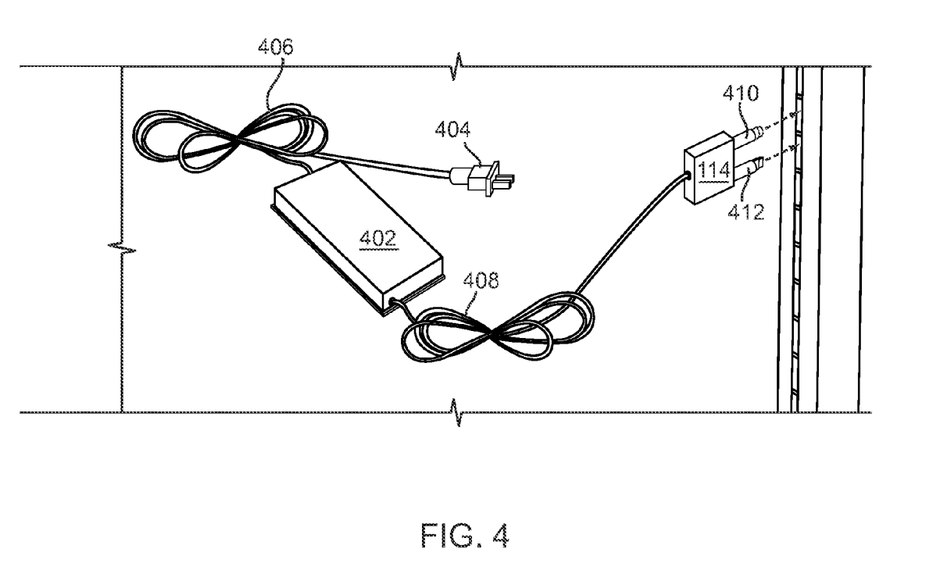
FIG. 4 is a perspective view of a power supply and a power terminal block of the shelf lighting system of FIG. 1.

One embodiment of the shelf lighting system 100 includes a lighting fixture 108, a shelf power cord 118, a connecting plug 116, a power track (see FIG. 2), a power terminal block 114, and a power supply (see FIG. 4). Further embodiments of the shelf lighting system 100 include additional ones of one or more of these components, subsets of these components, or further embodiments of one or more of each of these components. One embodiment of the shelf power system includes a power supply, a power terminal block 114, a power track, and a connecting plug 116. Further embodiments of the shelf power system include additional ones of one or more of these components, subsets of these components, or further embodiments of one or more of each of these components. For example, one embodiment of the shelf power system includes a power track and a connecting plug 116. Relationships among the various components are further detailed below. It should be appreciated that while a single modular shelf is illustrated in FIG. 1, multiple modular shelves may be incorporated with the embodiments described herein, where the multiple shelves can be adjacent to each other and/or in a back to back formation sharing shelf support columns 106.

Figure 2:
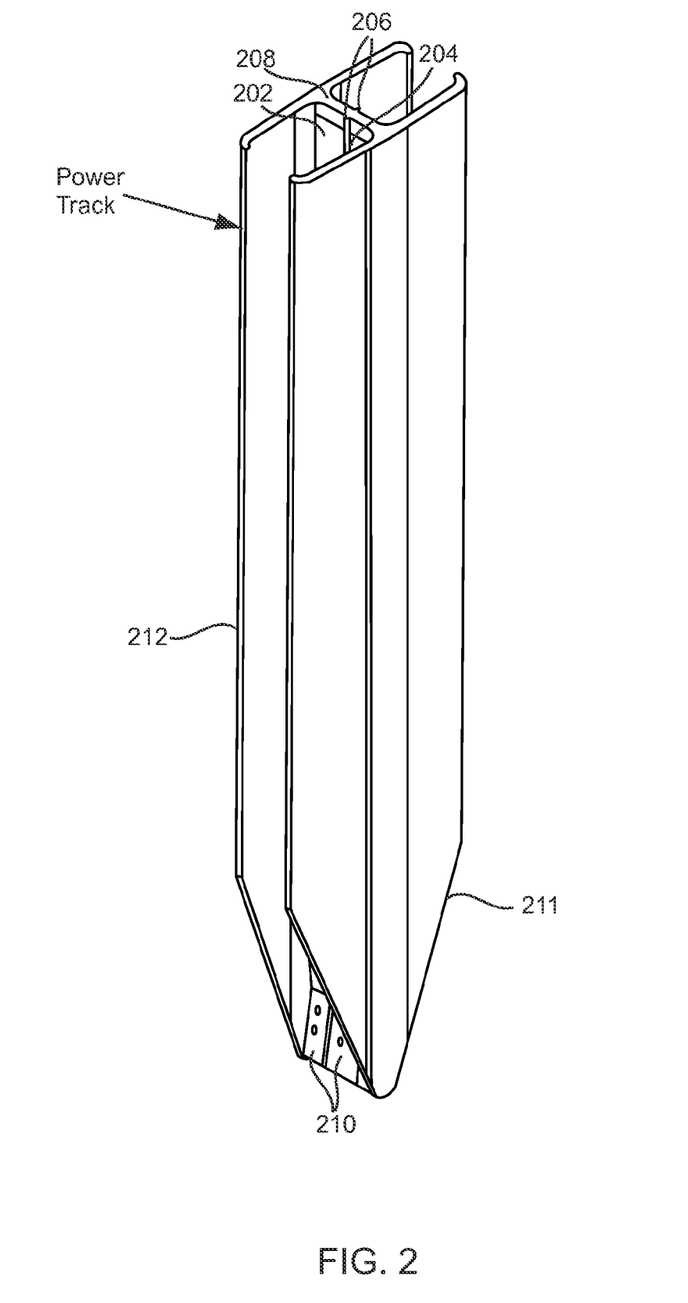
FIG. 2 is a perspective view of a power track of the shelf lighting system of FIG. 1.

FIG. 2 shows an embodiment of a power track 212. A first conductor 202 and a second conductor 204 run in parallel in the power track 212. In the embodiment shown, the first and second conductors 202, 204 extend from one end of the power track 212 to an opposing end of the power track 212 and the first and second conductors are spaced apart from each other. A physical insulative barrier 206 may or may not be placed between the conductors. When the power track 212 is mounted vertically, the first and second conductors 202, 204 in one embodiment extend from a bottom of the power track to a top of the power track.

One embodiment of the power track 212 is single-sided, and has one set of the first and second conductors 202, 204. The embodiment shown in FIG. 2 is double-sided, and has one set of conductors 202, 204 on one side and another set of conductors on the opposed side of a center rib 208. A bridge 210 couples the one set of conductors to the other set of conductors in some embodiments. The bridge 210 extends from one side to the opposed side of the center rib 208. With the bridge 210 in place, a single power supply (see FIG. 4) and associated power terminal block 114 can power both sets of conductors on a power track 212. If desired, a mitered end 211 of the power track 212 can be removed which in turn removes the bridge 210. It should be appreciated that removing the bridge 210 allows electrical independence of the two sets of conductors, i.e., the two sets of conductors can each have a dedicated power supply rather than a shared power supply.

Figure 3:
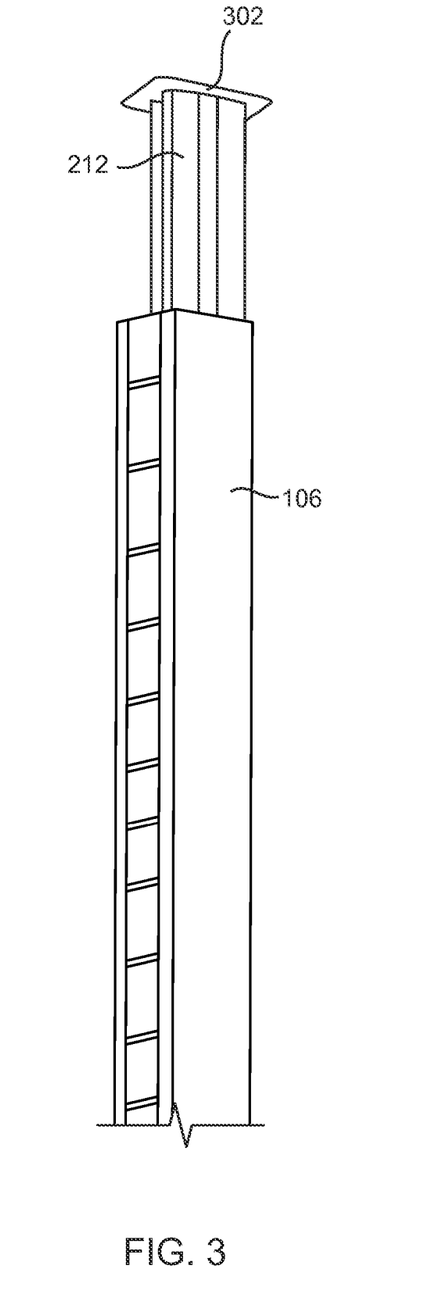
FIG. 3 is a perspective view of the power track of FIG. 2 inserted into a shelf support column.

FIG. 3 shows a power track 212 sliding into a shelf support column 106. A top cap 302 is attached to one end of the power track 212. The power track 212 is dimensioned to fit within the shelf support column 106. Custom lengths of the power track 212 and the shelf support column 106 can be created. It should be appreciated that the body of power track 212 may be composed of any suitable insulative material, such as commonly available plastic, while the conductors of the power track are composed of any conductive material, such as a metal.

FIG. 4 shows a driver or power supply that provides power to the shelf power system or the shelf lighting system. The power supply 402 is in electrical communication with the power terminal block 114 (from FIG. 1). An AC (alternating current) cord 406 connects an AC plug 404 to the power supply 402. Conventionally, the AC plug 404 can be inserted into an AC socket, e.g., a wall socket or a power strip socket. In another embodiment, the AC cord can be hard-wired into a junction box. A DC (direct current) cord 408 connects the power supply 402 to the power terminal block 114. In some embodiments, the DC cord supplies a low voltage current to the power supply. Further embodiments of the driver 400 can use batteries, DC to DC power conversion, solar power, etc. The power terminal block 114 electrically connects to the conductors of the power track 212, thereby providing electrical power to the power track 212, i.e., to the conductors 202, 204 in the power track 212 (see FIG. 2). In the embodiment shown, the power supply 402 provides DC electrical power, or low voltage power, of opposing polarities to the first conductor 202 and the second conductor 204 of the power track 212, e.g., a positive voltage and ground, a negative voltage and ground, or plus and minus polarities. As shown in the embodiment in FIG. 4, the power terminal block 114 has two prongs 410, 412 that are arranged for connecting to the first and second conductors 202, 204, respectively, of the power track 212. In one embodiment, the prongs 410, 412 are spring-loaded and have respective insulating sheaths similar to those of the connecting plug 116 as will be described. An axis for each of the insulating sheaths of prongs 410 and 412 may be aligned in some embodiments. However, the prongs 410 and 412 are offset from each other so that each of the prongs contacts one of the spaced apart conductors 202 and 204 of FIG. 2.

Figure 5A:
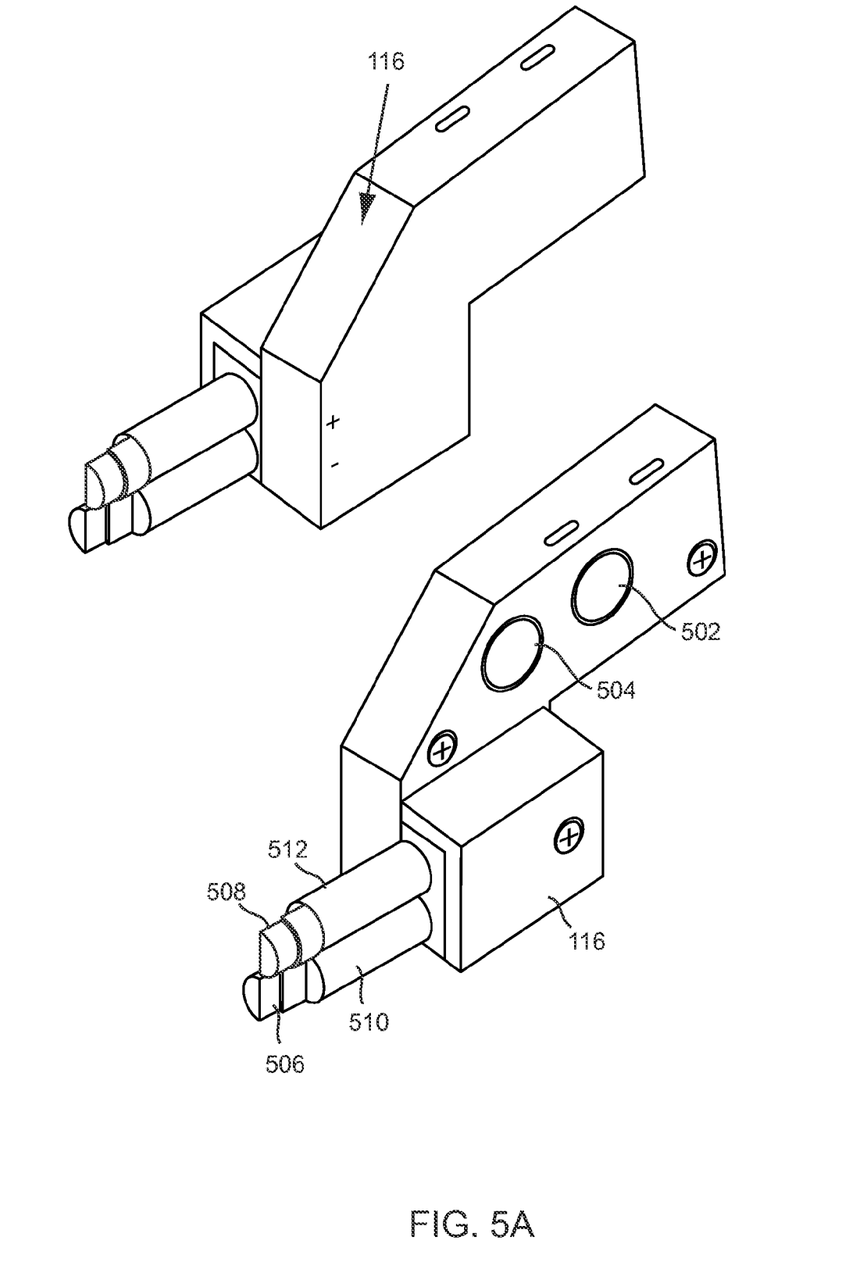
FIGS. 5A and 5B are perspective views of a connecting plug of the shelf lighting system of FIG. 1.
Figure 5B:
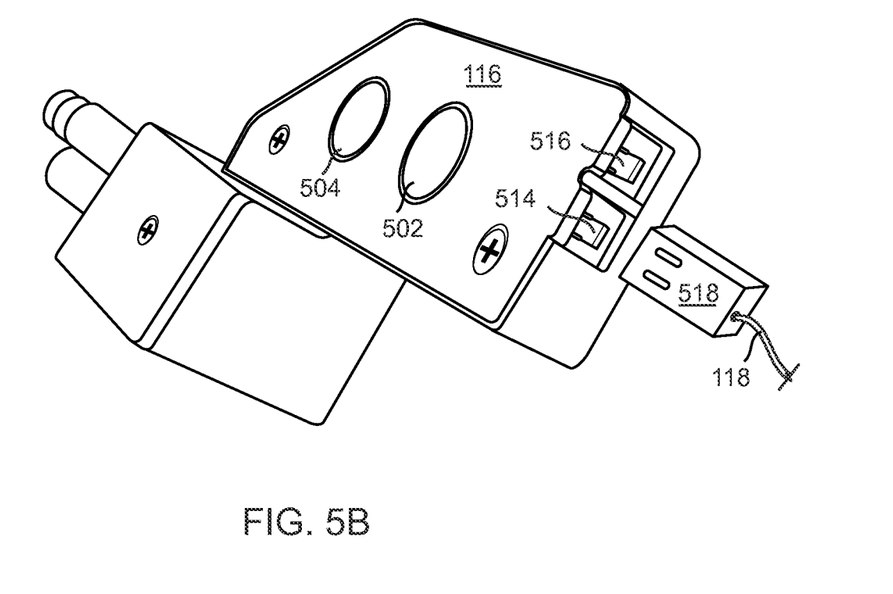

FIGS. 5A and 5B illustrate different views for a connecting plug 116 that provides power from the power track 212 to a lighting fixture or other electrical device. In the embodiment shown, the connecting plug 116 has a left-handed embodiment and a right-handed embodiment which are mirror images of each other. By employing mirror imaged connecting plugs 116, the connecting plugs 116 can be located on opposed, inward facing sides of opposed shelf brackets 104 holding a shelf, and be less visible than if one or both connecting plugs 116 were mounted on one or both outward facing sides of opposing shelf brackets. Each connecting plug 116 has an attachment mechanism, which attaches the connecting plug 116 to a shelf bracket 104. In the embodiment shown, the attachment mechanism includes one or more magnets 502, 504, which magnetically attach the connecting plug 116 to a steel shelf bracket 104. Other embodiments have other types of attachment mechanisms e.g., double faced tape, adhesives, etc.

Each connecting plug 116 has an electrical connector for connecting to the power track 212. In the embodiment shown, the electrical connector for connecting to the power track 212 has a first spring-loaded prong 506 and a second spring-loaded prong 508. Each prong 506, 508 has a respective insulating sheath 510 512 from which the prong of 506, 508 extends and retracts. The prongs 506, 508 are arranged to electrically contact the respective conductors 202, 204 of the power track 212, i.e., one prong connects to one conductor, the other prong connects to the other conductor.

Each connecting plug 116 has one or more electrical connectors for connecting to and providing power to a lighting fixture or other electrical device. In the embodiment shown, this electrical connector includes a first socket 514 and a second socket 516. Each socket 514, 516 is dimensioned to receive a plug 518, for example a plug from a lighting fixture or other electrical device. It is understood that electronic devices are a subset of electrical devices.

Figure 6:
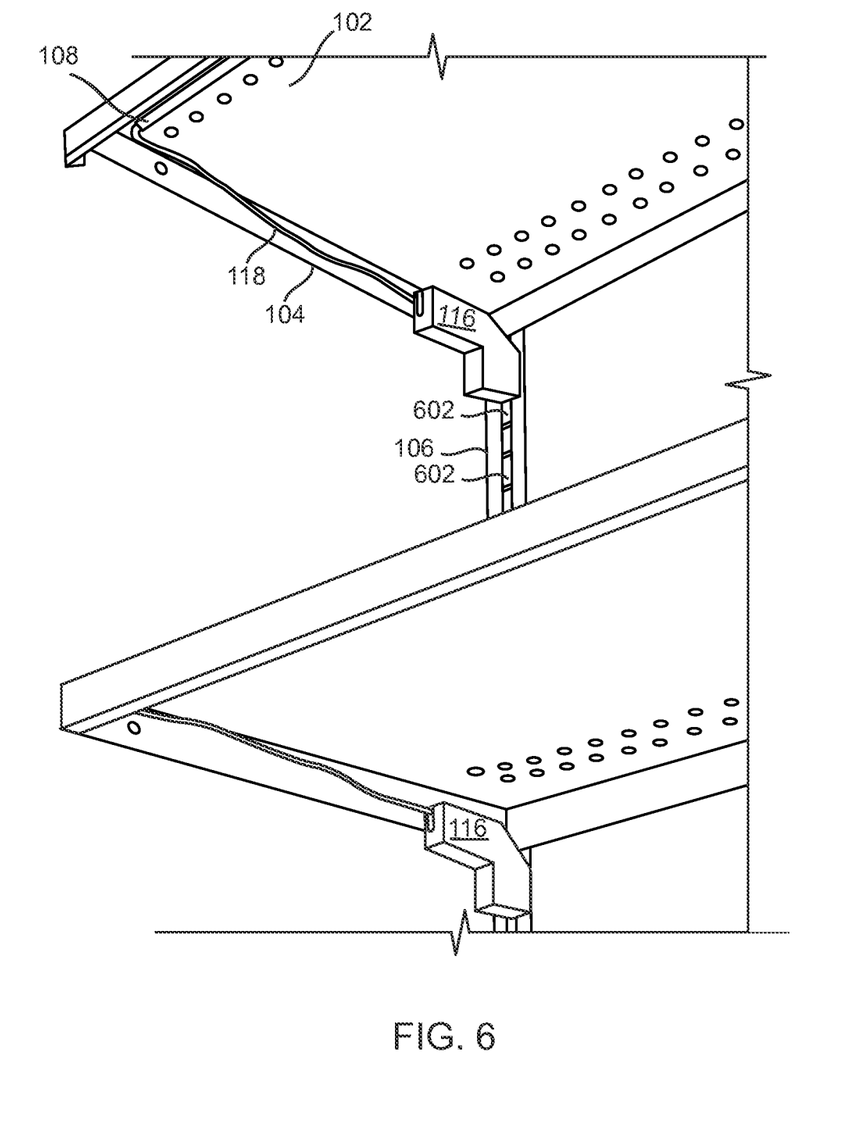
FIG. 6 is a perspective view of a shelf power cord and a lighting fixture of the shelf lighting system of FIG. 1.

FIG. 6 is a view from the underside of a shelf 102 (from FIG. 1), showing attachment of some of the components to the shelf 102. The connecting plug 116 is attached to the shelf bracket 104, by magnets of the connecting plug 116 in this embodiment. The shelf bracket 104 supports the shelf 102. Apertures 602 are provided in this embodiment of the shelf support column 106. The apertures 602 guide the prongs 506, 508 and insulating sheaths 510, 512 (from FIG. 5) of the connecting plug 116 while the connecting plug 116 is being connected to the power track 212 in some embodiments. Particularly, the apertures 602 guide the prongs 506, 508 to electrically contact the first conductor 202 and the second conductor 204 (from FIG. 2) of the power track 212. It should be appreciated that aperture 602 provides an opening or slot that supports shelf bracket 104. In one embodiment, the spring-loaded prongs 506, 508 compress and partially retract into the respective sheaths 510, 512, as the prongs 506, 508 contact the first conductor 202 and the second conductor 204. As the connecting plug 116 is fully inserted in the apertures 602 of the shelf support column 106, the spring-loaded prongs 506, 508 maintain a force upon the first and second conductors 202, 204 and maintain electrical contact thereto. In one embodiment, the first and second insulated sheaths 510, 512 are dimensioned to fit at least one alignment aperture in the shelf support column 106. In one embodiment, the prongs 506, 508 of the connecting plug 116 are dimensioned to fit at least one alignment aperture in the shelf support column 106. In one embodiment, the first and second insulated sheaths 510, 512 are joined to each other, i.e., conjoined. In one embodiment, the apertures 602 are dimensioned to fit the fingers or hooks of the shelf brackets 104, so that a shelf bracket 104 with an attached connecting plug 116 is readily inserted into apertures 602 and attached to a shelf support column 106.

The lighting fixture 108 is attached to the front edge of the shelf 102, or the underside of the shelf 102. In this embodiment, the lighting fixture 108 is a lighting strip, with multiple LEDs (light emitting diodes). Although white LEDs are used in this example, other colors of LEDs could be used as can readily be devised. Other types of lights, e.g., incandescent, halogen, are used in other embodiments. In this embodiment, the lighting fixture 108 includes at least one magnet. Some embodiments of the lighting fixture 108 have many magnets. The magnet or magnets attach the lighting fixture 108 to a steel shelf 102. Other embodiments have other attachment mechanisms.

A shelf power cord 118 electrically connects the lighting fixture 108 to the connecting plug 116. In the embodiment shown, the shelf power cord 118 has a first connector at one end and a second connector at an opposing end of the power cord 118. One connector is dimensioned to connect to the lighting fixture 108. The other connector is dimensioned to connect to the socket 514, 516 of the connecting plug 116, as, for example, by including a plug 518. For aesthetics, the shelf power cord 118 can be routed along an inner facing side of a shelf bracket 104 so as to not be visible to the casual observer. The lighting fixture 108 is thus powered by the power supply 402 via the power terminal block 114, the power track 212 and the connecting plug 116.

Embodiments of the shelf lighting system 100 and the shelf power system have many features that contribute to ease of use and reliability. For example, the use of spring-loaded prongs in the connecting plug 116 allows for easy, tool-free assembly, disassembly and repositioning of a shelf with an attached connecting plug 116. The use of spring-loaded prongs in the power terminal block 114 allows for easy, tool free assembly, disassembly and repositioning of the connection from the power supply 402 to the power track 212. The use of spring-loaded prongs in the connecting plug 116 and/or the power terminal block 114 makes embodiments of the assembled shelf lighting system 100 or shelf power system more resistant to vibration and relative movement of shelves than would be the case with rigid connectors which might break or separate and lose electrical connection. The use of alignment apertures in the shelf support column 106 for both alignment and installation of shelves and alignment and installation of dimensioned connecting plugs 116 ensures that shelves and connecting plugs 116 will align properly, physically and electrically, when a shelf with an attached connecting plug 116 is moved. The use of twin conductors inside of a power track 212 eliminates the need for visible vertical external wires, and allows a single connection to a power supply to be used on a single power track, to power all shelves attached to a specific shelf support column. The use of readily attached or removed connecting plugs enables individual shelves to have electrical lighting, or not, as need be. Magnets, as used in some embodiments of the connecting plug and/or the lighting fixture, allow ready attachment to and removal from shelf brackets and shelves composed of ferromagnetic material. DC power, of a voltage and current suitable for LED lighting or modern electronic devices, e.g., a low voltage power supply, is particularly safe and well-suited for use in the shelf lighting system and the shelf power system. Even so, embodiments have the twin conductors 202, 204 recessed inside the power track 212 so that the conductors are not readily accessible and thus a safer means to transfer power. Elsewhere, DC power, or low voltage power, is routed through insulated wires, and embodiments of the connecting plug in the power terminal block have insulated cases. It should be appreciated that the shelf brackets in the present system are not electrified.

Figure 7:
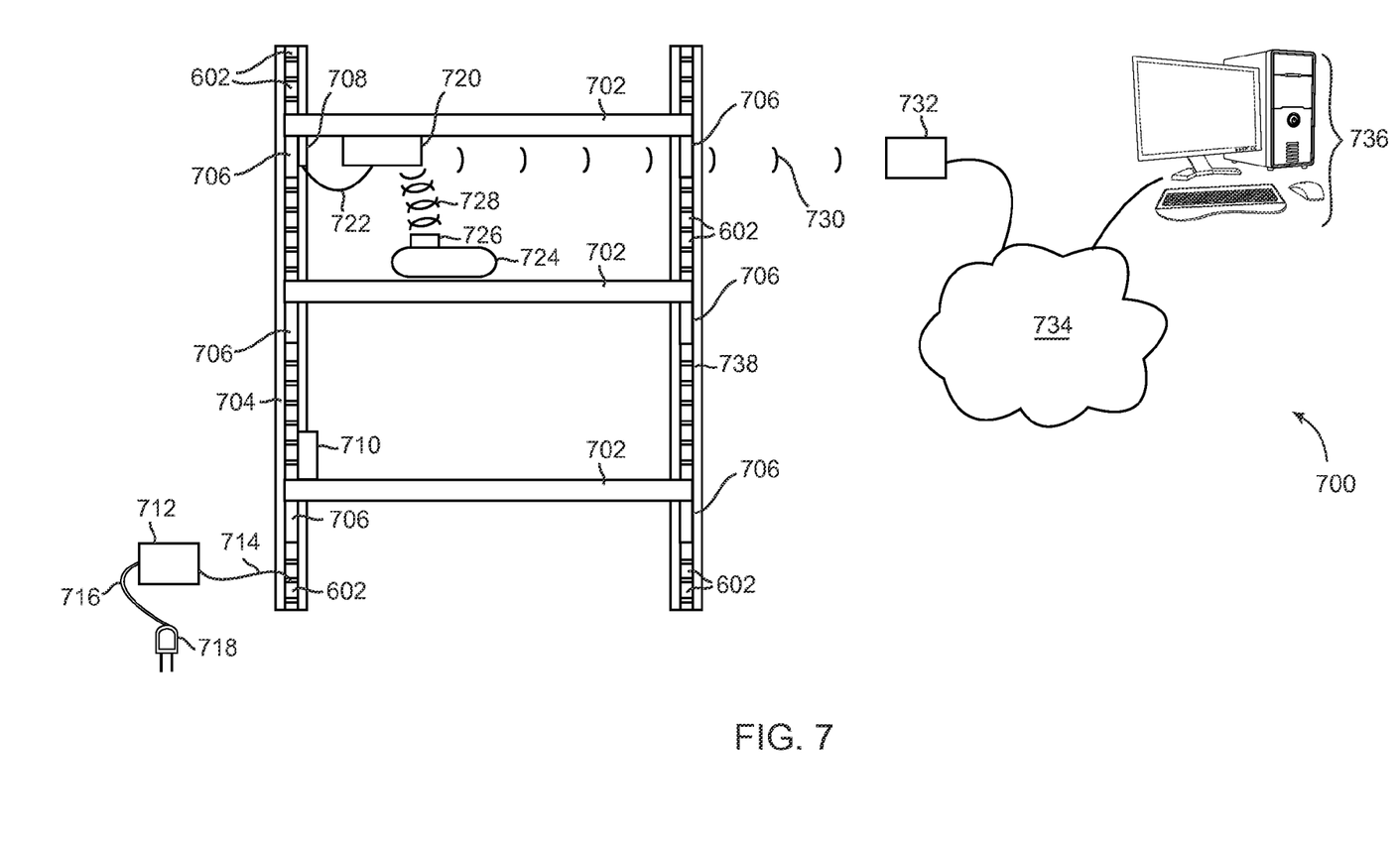
FIG. 7 is a schematic view of an inventory management system that integrates an inventory capture device with the shelf power system of FIG. 1.

It should be understood that embodiments of the shelf lighting system 100 and the shelf power system can be used to power various types of electrical devices, including electronic devices. FIG. 7 shows an embodiment of an inventory management system 700 that includes the shelf power system or a portion of the shelf lighting system 100. The inventory management system 700 includes an inventory capture device 720, which is electrically coupled to and powered by the shelf lighting system 100 or the shelf power system. In one embodiment, the shelf power cord 722 connects the inventory capture device 720 to the connecting plug 708, thereby providing power to the inventory capture device 720 from the power track 704. Some embodiments of the connecting plug 708 have more than one connector and can provide power for lighting and/or one or more electronic devices. The inventory capture device 720 in one embodiment includes an RFID (radiofrequency identification) reader that detects signal 728 in order to determine addition to a shelf, or removal from a shelf, of a product having an RFID tag 726. The inventory capture device 720 in another embodiment includes a barcode scanner that can scan barcodes on products being added to or removed from a shelf. Other types of inventory capture devices, including theft-prevention devices, can be powered by the shelf lighting system 100 or the shelf power system. Communication between the inventory capture device and a network, a computer, or other electronic device or system can be arranged wirelessly, through another conductor of the power track, or through the first or second conductor of the power track, for example by modulating a signal on top of a DC voltage or low voltage power supply.

Continuing with the embodiment shown in FIG. 7, the inventory capture device 720 is shown mounted to an underside of a shelf 702. Shelves 702 are supported by shelf brackets 706, which are attached to and supported by an embodiment of a power track 704 and a shelf support column 738. The power track 704 may be fitted inside a shelf support column (e.g., as in FIG. 3). An AC plug 718 and associated AC cord 716 are connected to a power supply 712. A DC cord 714 connects the power supply 712 to an embodiment of the power terminal block 710. The power terminal block 710 is electrically connected to the power track 704 (e.g., as shown in FIG. 6). Electrical conductors (see FIG. 2) of the power track 704 provide electrical power from the power terminal block 710 to an embodiment of the connecting plug 708. Shelf power cord 722 connects to the connecting plug 708, and connects to and provides power to the inventory capture device 720.

Radiofrequency waves 728 are sent out by the inventory capture device 720, which in this example includes an RFID scanner, and an RFID tag 726 attached to an article of manufacture 724 responds in a manner known in the art. The inventory capture device 720 processes the response from the RFID device 726, and sends out a wireless communication message 730. The wireless communication message 730 is received by a wireless router 732, which communicates the message through a network cloud 734, e.g., a local area network or the Internet to an inventory management server 736 or other computing device. In this manner, the inventory management server 736 can process information relating to addition or removal of merchandise with RFID devices, or similar devices attached thereto. In other embodiments, the inventory capture device 720 includes a barcode scanner and sends out a scanning laser beam to scan barcodes attached to products. Alternatively, the inventory capture device 720 includes a camera and processes images of merchandise, etc. In addition, the packaging may include a printed RFID tag, or some other encoded printed marking on the packaging of the inventoried goods, that is captured through inventory capture device 720. Accordingly, the inventory capture device can scan the goods upon removal and the expense of placing an active tag on each of the inventoried goods, such as an RFID tag, is avoided by the use of the passive printing or other suitable marking or identifier. Thus, through the embodiments provided herein, the inventory within a store or warehouse may be updated in real time as products are added or removed from shelves through a suitable inventory management system integrated with the embodiments described herein. It should be appreciated that wired connections may replace the wireless connections in some embodiments.

In another embodiment, the inventory management system may be configured to display pricing of items on respective shelves. In some embodiments, a display screen, ticker, ribbon, etc., affixed along the shelf edge may be powered through the shelf power system described herein. The display screen may be in wired or wireless communication with the inventory management system so that pricing may be changed as desired through a computing device of the inventory management system. It should be appreciated that a point of sale system tied to the inventory management system has the ability to update the inventory as soon as an item is removed from the shelf. In addition, the inventory management system may intelligently adjust prices based on time of day, remaining inventory, or any other tracked parameter. The adjusted prices may appear on the display screen in some embodiments as directed through the inventory management system.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. In some embodiments the computer readable medium is a non-transient storage medium. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, hardware processors, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A shelf power system comprising:
   a power track with a first conductor and a second conductor along a length of the power track; and
   a plug having:
      a coupling mechanism configured to couple the plug to a shelf bracket, the coupling mechanism of the plug including at least one magnet;
      a first prong and a second prong extending from a surface of the plug, the first prong and the second prong configured to couple the plug to the power track such that the first prong electrically contacts the first conductor and the second prong electrically contacts the second conductor; and
      a connector configured to provide an electrical connection to the first prong and the second prong.

2. The shelf power system of claim 1 wherein the plug further comprises:
   a first insulated sheath through which the first prong extends and retracts; and
   a second insulated sheath through which the second prong extends and retracts; and
   the first and second insulated sheaths are configured to be inserted through an aperture in a shelf support column accessing the power track.

3. The shelf power system of claim 2 wherein the aperture is different than an aperture utilized for supporting the shelf bracket.

4. The shelf power system of claim 1 further comprising:
   a power supply configured to provide direct current (DC) electrical power of opposing polarities to the first conductor and the second conductor of the power track.

5. The shelf power system of claim 1 further comprising:
   a lighting fixture affixed to a bottom surface of a shelf, the lighting fixture electrically coupled to the plug.

6. The shelf power system of claim 1 wherein:
   the power track is double-sided, with two conductors per side.

7. The shelf power system of claim 1 wherein the first prong and the second prong are spring-loaded.

8. A shelf lighting system comprising:
   a power track disposed within a vertical support member of the shelf lighting system;
   a power source having a power supply and a power terminal block configured to electrically couple the power supply to the power track;
   a lighting fixture; and
   a plug that is configured to attach to a shelf bracket extending from the vertical support member, the plug operable to electrically couple the power track to the lighting fixture, wherein the lighting fixture is powered by the power supply via the power terminal block, the power track and the plug, and wherein the plug is magnetically attached to the shelf bracket and wherein the lighting fixture is magnetically attached to the shelf.

9. The shelf lighting system of claim 8 wherein supports of the shelf bracket extend through alignment apertures of the vertical support member and wherein the supports of the shelf bracket are spaced apart from a surface of the power track.

10. The shelf lighting system of claim 8 wherein the vertical support member further comprises:
    alignment apertures providing access for the connecting plug to the power track, the alignment apertures providing support for the shelf bracket.

11. The shelf lighting system of claim 10 wherein the plug includes prongs dimensioned to extend through the alignment apertures to contact the power track.

12. The shelf lighting system of claim 10 wherein alignment apertures providing access for the connecting plug are different than the alignment apertures providing access for the shelf bracket.

13. The shelf lighting system of claim 8 wherein the power track includes a first conductor and a second conductor, the first conductor and the second conductor adjacent to each other and spaced apart from each other.

14. The shelf lighting system of claim 13 wherein the power track includes a third conductor and a fourth conductor, the third conductor and the fourth conductor adjacent to each other and spaced apart from each other.

15. The shelf lighting system of claim 14 wherein the first conductor is spaced apart and opposing the third conductor and wherein the second conductor is spaced apart and opposing the fourth conductor.

16. An inventory management system integrated with a shelf lighting system, comprising:
    a power track disposed within a vertical support member of the shelf lighting system;
    a power source having a power supply and a power terminal block configured to electrically couple the power supply to the power track;
    a lighting fixture coupled to a bottom surface of a shelf of the shelf lighting system;
    a plug that is configured to attach to a shelf bracket extending from the vertical support member, the plug operable to electrically couple the power track to the lighting fixture, wherein the lighting fixture is powered by the power supply via the power terminal block, the power track and the plug;
    an inventory capture device coupled to the shelf lighting system, the inventory capture device powered by the power supply through the power track and the plug, the inventory capture device in communication with a computing device having the inventory management system stored therein, wherein the inventory capture device is operable to detect removal of an item from the shelf.

17. The inventory management system of claim 16 wherein:
    the inventory capture device is one of a RFID reader, a barcode scanner, or a theft-prevention device.

18. The inventory management system of claim 16 wherein:
   the inventory capture device is in communication with the computing device through a wireless connection.

\* \* \* \* \*